United States Patent
Strack et al.

(10) Patent No.: US 7,669,804 B2
(45) Date of Patent: Mar. 2, 2010

(54) SPACECRAFT INTERFACE MODULE FOR ENABLING VERSATILE SPACE PLATFORM LOGISTICS SUPPORT

(75) Inventors: David F. L. Strack, Friendswood, TX (US); Brian H. Rishikof, Houston, TX (US)

(73) Assignee: Odyssey Space Research, LLC, Houston, TX (US)

( * ) Notice: Subject to any disclaimer, the term of this patent is extended or adjusted under 35 U.S.C. 154(b) by 301 days.

(21) Appl. No.: 11/423,208

(22) Filed: Jun. 9, 2006

(65) Prior Publication Data

US 2006/0278765 A1    Dec. 14, 2006

Related U.S. Application Data

(60) Provisional application No. 60/688,823, filed on Jun. 9, 2005, provisional application No. 60/710,855, filed on Aug. 24, 2005.

(51) Int. Cl.
*B64G 1/64* (2006.01)
(52) U.S. Cl. .................................. 244/172.4
(58) Field of Classification Search .......... 244/172.4–6, 244/1 TD, 172.1, 159.4
See application file for complete search history.

(56) References Cited

U.S. PATENT DOCUMENTS

| | | | | |
|---|---|---|---|---|
| 4,903,919 A | * | 2/1990 | Johnson et al. | 244/172.4 |
| 5,299,764 A | * | 4/1994 | Scott | 244/172.5 |
| 6,149,104 A | * | 11/2000 | Soranno | 244/159.4 |

* cited by examiner

*Primary Examiner*—Timothy D Collins
*Assistant Examiner*—Michael Kreiner
(74) *Attorney, Agent, or Firm*—Law Offices of Mark L. Berrier

(57) ABSTRACT

Systems and methods to deliver crew, cargo and other logistics services to space platforms. In one embodiment, a rendezvous and docking vehicle (RDV) comprises two docking mechanisms coupled to the RDV body. A pressurizable passageway connects the docking mechanisms. In one embodiment, the two docking mechanisms are different. An alternative embodiment comprises docking mechanisms which are the same. Also included is a flight control system. The flight control system may vary between embodiments, being autonomous, automated, or remotely controlled (e.g., remote pilot). One embodiment can also include a docking control system in the RDV. A propulsion system is coupled to the RDV in some embodiments, and the RDV may be augmented by a mated spacecraft's propulsion system in other embodiments. The mated spacecraft's propulsion system may even be under the control of the RDV.

14 Claims, 7 Drawing Sheets

SPACECRAFT INTERFACE MODULE FOR ENABLING VERSATILE SPACE PLATFORM LOGISTICS SUPPORT

RELATED APPLICATIONS

This application claims the benefit of U.S. Provisional Patent Application Ser. No. 60/688,823 by Brian H. Rishikoff and David F. L. Strack, filed Jun. 9, 2005, and U.S. Provisional Patent Application Ser. No. 60/710,855 by David F. L. Strack and Brian H. Rishikoff, filed Aug. 24, 2005, both of which are hereby incorporated by reference as if set forth herein in their entirety.

BACKGROUND

1. Field of the Invention

The invention relates generally to systems and methods to deliver crew, cargo and other logistics services to space platforms. More particularly, the invention relates to systems and methods for automated rendezvous and docking of a spacecraft to a space platform.

2. Related Art

The Space Shuttle has provided a majority of the assembly and logistics service support to the International Space Station (ISS). The shuttles are expensive to operate, and they place personnel at risk even when a primary payload does not otherwise require a crew. The Russian Soyuz and Progress spacecraft are also used for crew and cargo transport, respectively, to the ISS, including the transfer of consumables such as propellant. Both of these systems have a lengthy heritage and have driven some of the design of the ISS they now support. The European and Japanese space agency transfer vehicles currently in development will be capable of transporting cargo to and from the ISS as well. The development of these systems has helped to identify opportunities to improve on-orbit operations.

A spacecraft is designed to fulfill a set of requirements which reflect mission objectives as well as many constraints. The spacecraft systems are designed to carry out the mission and support the needed cargo. While there are general requirements, detailed requirements are honed to meet specific mission requirements and other considerations are made with regard to performance capabilities, flight environments, safety, mechanical and electrical interfaces, guidelines, standards, regulations, flight rules, schedule, and budget, for example. A number of alternatives may meet the requirements and the systems and subsystems are designed and sized to best satisfy the requirements. The resulting structures and components are modeled, simulated and constructed. Each of these individually, and integrated as a system, must pass through various verification, validation, qualification, certification and acceptance tests. The process is typically long and expensive. The complexity is compounded by the number of systems, their interactions with each other and with other systems and spacecraft. Even the smallest of changes at an inopportune point in the process is potentially very expensive. That being said, large sums are spent to save even larger sums or to mitigate risks.

The cost of spacecraft and their missions is unavoidably tied to the delivering mass to orbit. So, the mass of the spacecraft and its various components is of great concern. The spacecraft and their cargo become high-value assets, and the risks to these mitigated to the greatest degree possible by various logistical measures which, in turn, make the systems and procedures even more expensive to undertake. The result is that simplifications to spacecraft and their missions can greatly affect (reduce) their cost.

One such simplification is to relieve a spacecraft of some part of its functionality or mission, for example, by placing that responsibility with another system or spacecraft. If the other system or spacecraft is reusable, the expense associated with that part of functionality or mission can be amortized over a number of spacecraft or missions; on-orbit operations is one area in which this can be done. The orbital maneuvering, and automated rendezvous and docking (AR&D) functions are candidates for incorporation into a reusable spacecraft.

Transfer vehicles such as the Orbital Maneuvering Vehicle (OMV) have been proposed. The OMV is used to change the orbital plane of a second spacecraft, or to boost the second spacecraft into a higher orbit. This allows the second spacecraft to be built with much smaller propulsive systems designed primarily for attitude control (reaction control systems). The OMV stays in orbit and is able to provide its services to several spacecraft. The result is that the engines used for the orbital changes need only be launched into orbit once, not with each spacecraft. The OMV must carry enough propellant for all of its missions, but the systems associated with carrying the propellant (the "overhead") are amortized over all of the missions. Also, additional reserve propellant is usually carried by a spacecraft to enable the spacecraft to handle a worst-case scenario. That reserve is likely never used so the cost of putting it into orbit is "wasted". The OMV is able to use that reserve propellant for another mission.

Attempts are being made to simplify the process of mating visiting vehicles such as logistics spacecraft to the ISS. One such attempt involves the free-flying capture of a visiting vehicle with a subsequent berthing rather than relying on the visiting vehicle to dock directly with the ISS. When docking, a visiting vehicle must safely align itself with a docking port and drive into it with enough force to properly mate with the docking mechanism but not so much as to damage the ISS or force it "out of control". A berthing operation requires the visiting vehicle to rendezvous with the ISS and to move to within reach of the ISS's robotic arm subject to a number of constraints. The robotic arm then "grabs" and pulls the visiting vehicle to a docking port. The free-flying capture and berthing procedure, however, has proven to be more problematic than hoped and better means for docking visiting vehicles are being explored.

In the early 1990's, a tug was proposed for transferring a supply spacecraft from its orbit to the proximity of the International Space Station (ISS). The features of the proposed system did not justify its manufacture and it was never built. A tug travels to the supply spacecraft and grabs or mates with it. The tug then "pushes" the supply spacecraft to the ISS. The supply spacecraft is then docked. The supply spacecraft is driven into a compatible and available docking port where the supply spacecraft's docking mechanism mates directly with the ISS. The tug is then free to go or may remain to remove the supply spacecraft.

The visiting vehicle must have an ISS compatible docking mechanism and also have appropriate fixtures for the tug to attach to the supply spacecraft. In the case of a supply vehicle needing to perform a fuel transfer, the appropriate ISS port would be a port with a Common Berthing Mechanism (CBM) or the Russian Probe and Cone Mechanism (RPCM).

The ISS is also equipped with an Androgynous Peripheral Attachment System (APAS) which is used by the Shuttles. The ISS is equipped with 2 such mechanisms. It is notable that the both the CBM and APAS are no longer manufactured and that a limited number are available to be used on supply spacecraft. The preservation of these mechanisms is highly desirable. After resupply, the current roster of supply spacecraft deorbit and burn up in the atmosphere (e.g., HTV, ATV, Progress), hence the mechanism for docking with the ISS is lost. A Crew Exploration Vehicle would deorbit and be recovered as are other manned spacecraft such as the Shuttle or Soyuz. However, the deorbit operations may require the docking mechanism be jettisoned.

SUMMARY OF THE INVENTION

One or more embodiments of the invention are described below. It should be noted that these and any other embodiments described below are exemplary and are intended to be illustrative of the invention rather than limiting.

One or more of the problems outlined above may be solved by the various embodiments of the invention. Broadly speaking, the invention relates to systems and methods to deliver crew, cargo and other logistics services to space platforms. In one embodiment, a rendezvous and docking vehicle (RDV) comprises two docking mechanisms coupled to the RDV body. A pressurizable passageway connects the docking mechanisms. In one embodiment, the two docking mechanisms are different. An alternative embodiment comprises docking mechanisms which are the same. Also included is a flight control system. The flight control system may vary between embodiments, being autonomous, automated, or remotely controlled (e.g., remote pilot). One embodiment can also include a docking control system in the RDV. A propulsion system is coupled to the RDV in some embodiments, and the RDV may be augmented by a mated spacecraft's propulsion system in other embodiments. The mated spacecraft's propulsion system may even be under the control of the RDV.

An alternative embodiment comprises two modules, each module having a docking mechanism, a module body and a mechanism to mate with the other module. In one embodiment, the module bodies are substantially the same. That is, the bodies are of the same design or construction, but the systems and mechanisms they house may be different. In another embodiment, a grapple fixture is coupled to the RDV or each of the modules to facilitate capture and/or manipulation of the RDV and/or RDV modules.

In one embodiment, the RDV rendezvous and mates (e.g., docks) with a target spacecraft. The RDV, in combination with the mated target spacecraft, then rendezvous and mates with a second target spacecraft. Cargo (e.g., food, water, oxygen, fuel, equipment, etc.) and crew can then be transferred through the RDV (via pressurized passageway or plumbing) to be delivered or removed. In one embodiment, a multi-module RDV is split (i.e., the constituent RDV modules are unmated) and one of the modules, mated to a target spacecraft, is repositioned. The repositioned module may be mated to the target spacecraft which is mated with the other RDV module, or it may be mated to another target spacecraft.

In yet another embodiment, the RDV includes a manipulator system coupled to the RDV. The manipulator system may have one or more mechanisms such as robotic arms. In one embodiment, the RDV uses the manipulator system to extricate itself from its coupled target spacecraft (e.g., using the manipulator system). In another, the manipulator system is used to mate the target spacecraft.

Numerous additional embodiments are also possible.

BRIEF DESCRIPTION OF THE DRAWINGS

Various objects and advantages of the invention may become apparent upon reading the following detailed description and upon reference to the accompanying drawings.

Illustrated in FIG. 1 is a flowchart of a basic operational scenario in accordance with one embodiment.

Figure 2:
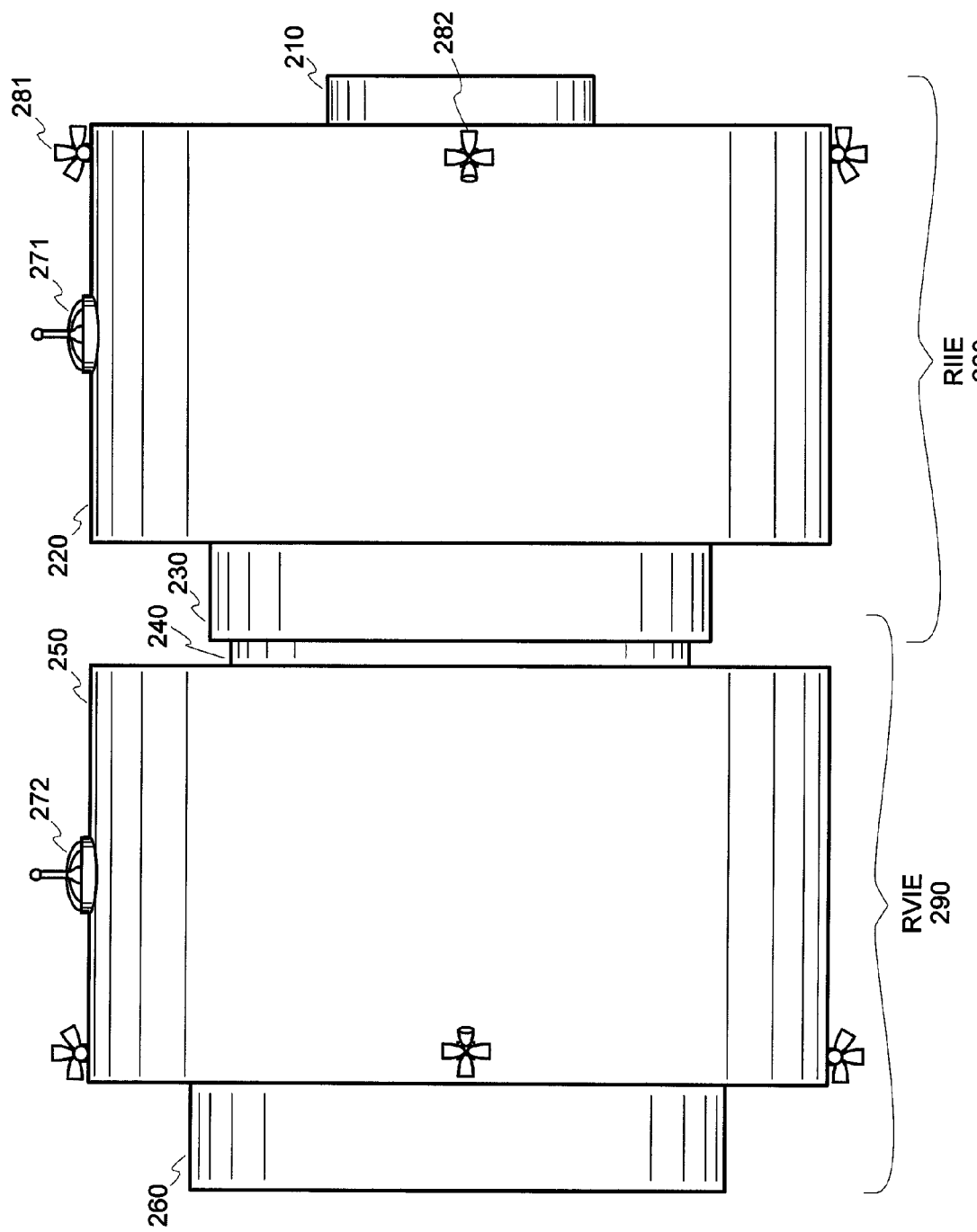

Illustrated in FIG. 2 is a functional block diagram in accordance with one embodiment.

Figure 3:
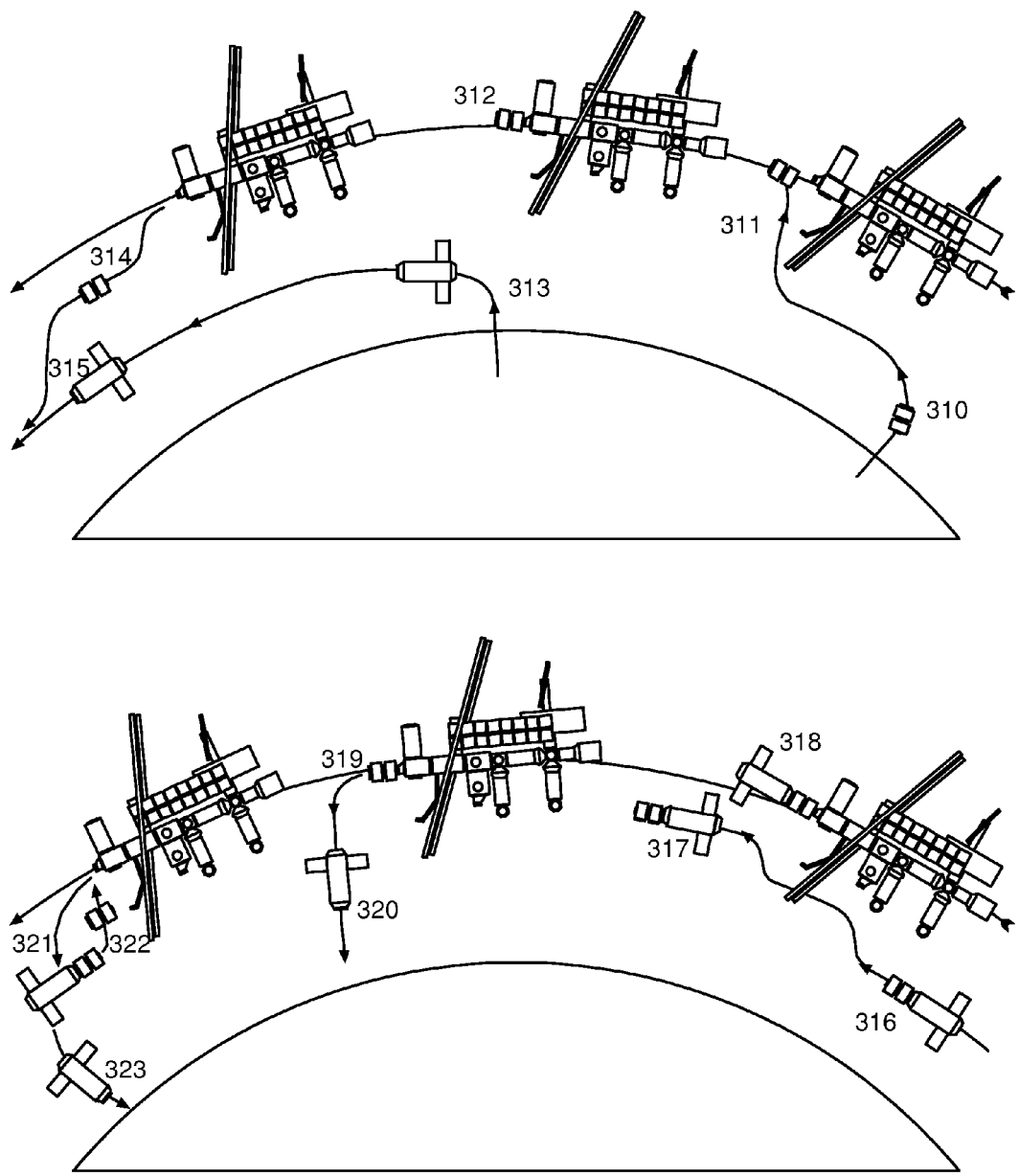

Illustrated in FIG. 3 is an operational scenario of an RDV in accordance with one embodiment.

Figure 4:
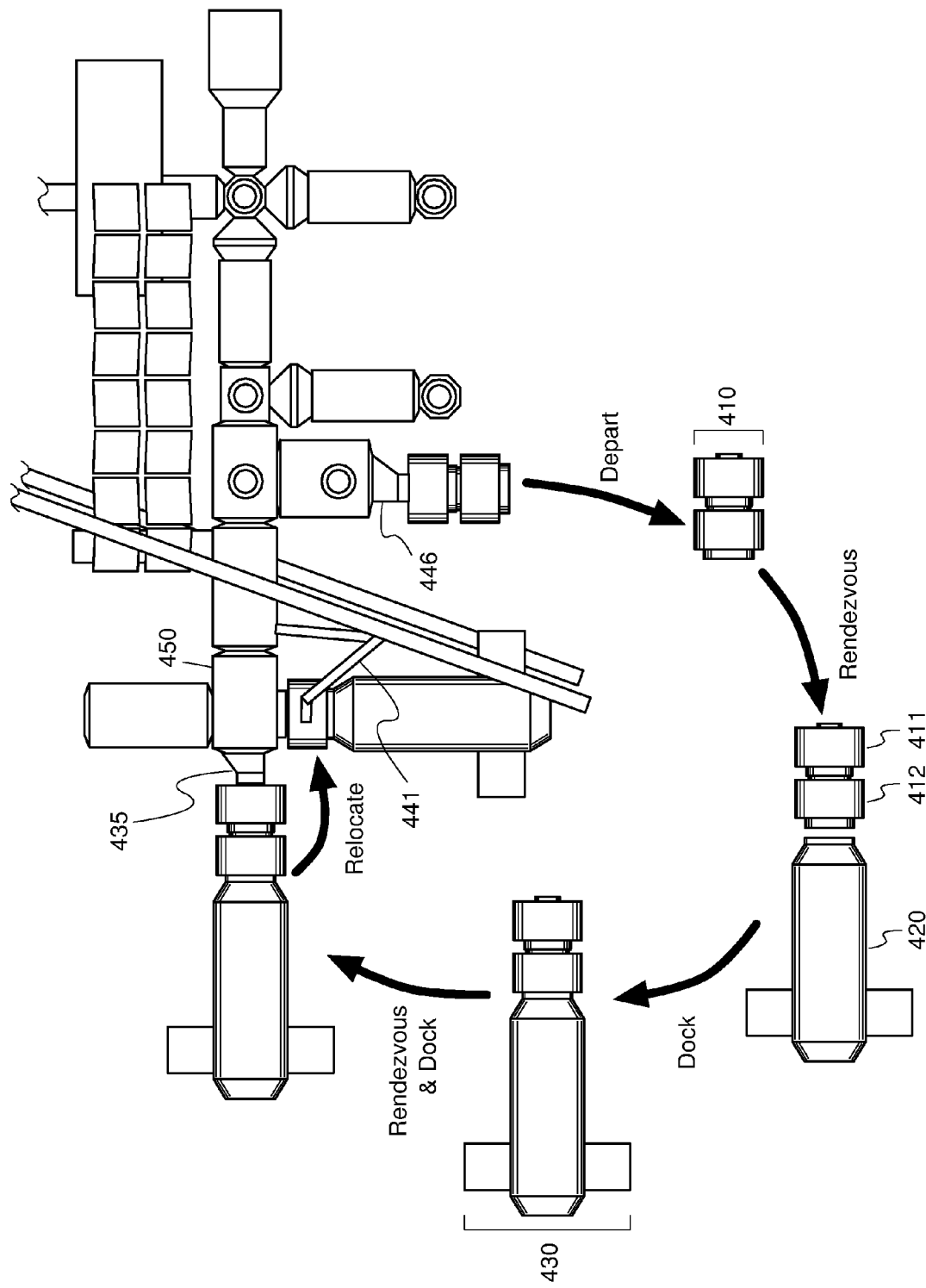

Illustrated in FIG. 4 is the retrieval, docking, and relocation of a logistics spacecraft in accordance with one embodiment.

Illustrated in FIG. 5 is the rendezvous and docking of a logistics spacecraft in accordance with one embodiment.

Figure 6:
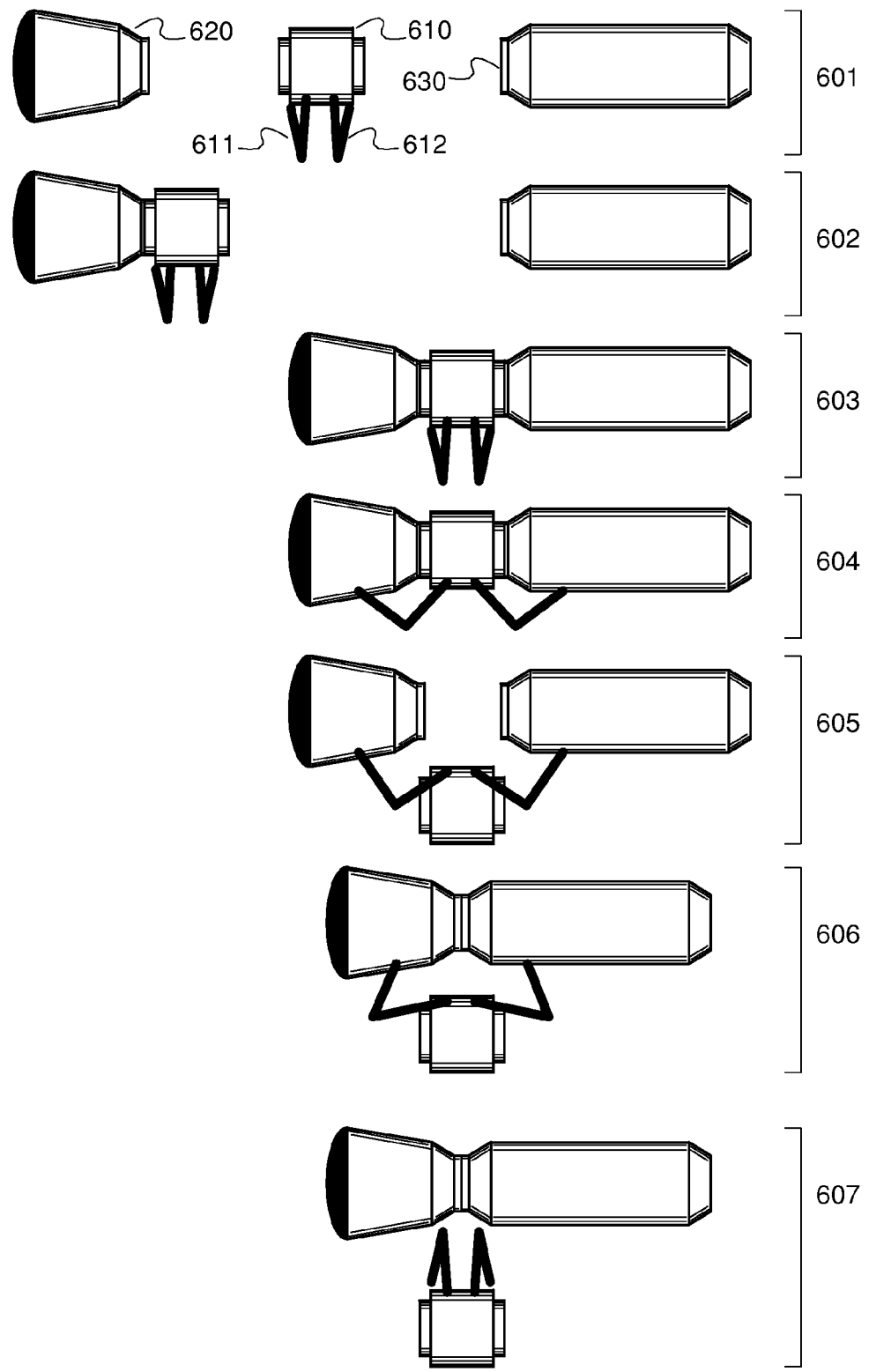

Illustrated in FIG. 6 is the mating of two target vehicles in accordance with one embodiment.

Figure 7:
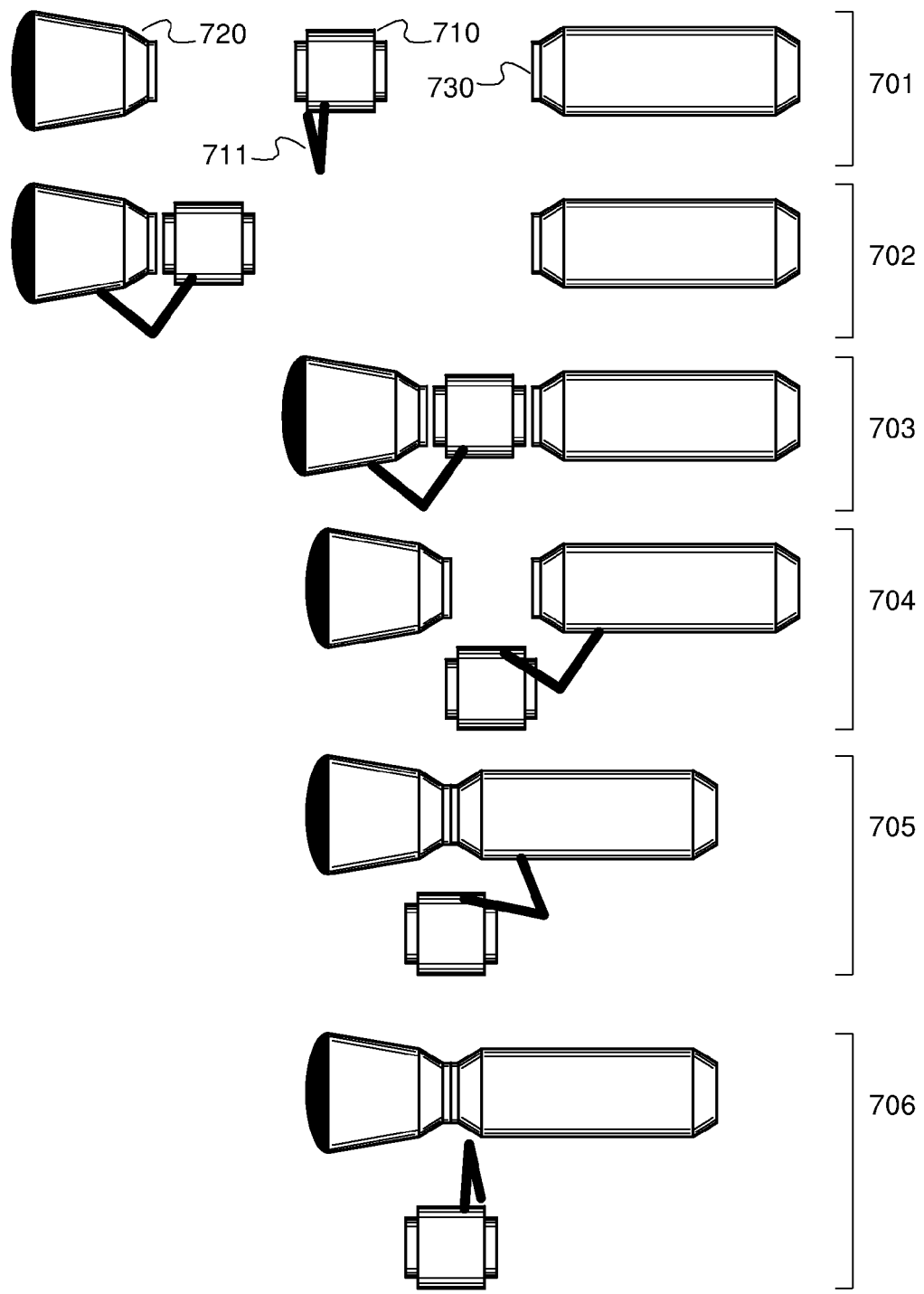

Illustrated in FIG. 7 is the mating of two target vehicles in accordance with one embodiment.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention relates to systems and methods to deliver crew, cargo and other logistics services to space platforms. More particularly, the invention relates to systems and methods for automated rendezvous and docking of a logistics spacecraft to a space platform.

Conventionally, a spacecraft providing logistics support to a space platform such as the ISS is equipped with all the systems necessary to perform far-field rendezvous, rendezvous, and proximity operations (including docking) with the platform. The logistics support spacecraft must also have systems needed to perform any departure and deorbit maneuvers. An alternative architecture which employs an intermediate interface spacecraft and which eliminates the need for many of these systems on logistics support spacecraft is described below.

An architecture based on a spacecraft interface module can dramatically lower cost while satisfying the so-called "last mile" requirements for rendezvous and docking with space platforms. This is an effective strategy to stimulate commercial participation in space operations and to reduce overall cost and risk associated with the automated rendezvous and docking (AR&D) function. This strategy protects the safety of astronauts and high value assets such as the International Space Station (ISS). The central element of such an architecture is a reusable spacecraft which serves as an interface between other (e.g., logistics support and platform) spacecraft. This new spacecraft may be referred to as a "Spacecraft Interface Module" (SIM) or, alternatively, a "Rendezvous and Docking Vehicle" (RDV). The RDV performs retrieval and delivery functions for logistics spacecraft and interfaces them with another spacecraft (e.g., a space platform such as the International Space Station—ISS). The "automated" flight of the RDV is to be construed here as the automated, autonomous or remotely piloted (from space or the ground) flight.

The logistics spacecraft are developed and launched by third parties into orbits which are compatible with defined RDV interfaces. These logistics spacecraft, expected to be provided by independent commercial and/or government entities, include (but are not limited to): cargo elements, propulsion elements, crew vehicles, external pallets, and emergency evacuation vehicles. The burden of providing these elements with automated rendezvous and docking (AR&D) capability and certifying this capability can be prohibitive. The RDV can separately provide AR&D capability to the logistics spacecraft. This method enhances safety by having a single, controlled, rigorously certified interface between the RDV and the ISS rather than multiple, concept-specific certifications. The RDV reduces risk of mission loss because it is the only "active" vehicle in the rendezvous and docking phases, and it will have undergone rigorous certification. (In some embodiments, a spacecraft docked with the RDV may even give up control of some spacecraft systems to the RDV.)

The RDV enables the simplification of the logistics spacecraft. The RDV performs the AR&D functions of the combined RDV/logistics spacecraft, relieving the logistics spacecraft of that responsibility and eliminating the need for the associated systems. The mass savings translates into a greater cargo mass (e.g., the mass savings from eliminated flight avionics and propellant included in the RDV). This can be viewed as the percentage of cargo delivered as a function of mass to ISS orbit. Current cargo spacecraft (Progress, ATV, HTV) deliver up to 30% less cargo than various designs of a simplified logistics spacecraft relieved of the AR&D burden (prorating the RDV mass). The increase in efficiency of the simplified logistics spacecraft results in significantly fewer launches to deliver the same cargo mass.

Described below are various embodiments of an alternative spacecraft that provides many of the foregoing capabilities without the disadvantages of conventional systems. This new type of spacecraft, the RDV, can be used to ferry various logistics spacecraft to, and dock with, the ISS as well as performing other functions. This RDV can perform automated rendezvous and docking (AR&D) of a spacecraft with a target platform (such as a supply vehicle with a space station) with the RDV as an intermediate element. The RDV also serves as an adapter between docking mechanisms of different types. Some embodiments of the RDV can be split to allow the repositioning of a logistics spacecraft from one docking port to another. The RDV can not only enable the use of commercial spacecraft in services such as low-cost ISS cargo service, it would enable Crew Exploration Vehicle (CEV) missions to the ISS, support on-orbit test and demonstration of various technologies and vehicles, and provide for the efficient on-orbit assembly of other platforms/spacecraft such as might be used in lunar or interplanetary missions. The RDV may also be used to reboost another spacecraft or act as an interface to enable a reboost by another spacecraft.

An embodiment incorporating APAS, CBMs and the planned NASA Exploration Initiative docking mechanism would provide the following key capabilities. The RDV would be cost effective when compared to other options. It would enable the delivery of payloads to ISS without the extreme expense and complexity of individual commercial providers being separately required to meet all ISS safety and integration constraints. Commercial developers could provide "curb-side" service as opposed to "door-to-door" service to the ISS. Based on the projected ISS needs, this should enable true commercial competition for supply services. The RDV would provide a standard mechanical interface that is common to both NASA Exploration Initiative vehicles and ISS commercial cargo supply (ICCS) vehicles. The RDV would establish standard interfaces for both ICCS and NASA Exploration Initiative vehicles (e.g., communication, relative navigation, command and data handling, etc.). The RDV would reduce the need for ISS resources and operations by providing a single interface and a single vehicle certification to accommodate multiple, different delivery vehicles. There would be only one set of requirements and operational constraints to negotiate.

The RDV could also accommodate the unique considerations of the legacy mechanisms (such as ISS mechanisms no longer in production, and of various types) and allows new vehicles to use a modern, standard "production" docking mechanism based on more recent (e.g., NASA Exploration Initiative) requirements. The RDV would enable both ICCS vehicles and CEV to rendezvous and dock to the ISS without requiring major (or perhaps any) modifications to the ISS. The RDV would eliminate the need for separate development and delivery of docking/berthing adapters (i.e., adapters for CEV and ICCS to be delivered by the Space Shuttle or other means). The RDV would allow for the delivery of ISS racks and use of the CBM interfaces (water, gas, waste water, etc.) while eliminating the safety and mission success risks associated with free-flyer capture. A free-flyer capture has not been performed at the ISS and currently will require modification of the ISS robotics in addition to requiring safety waivers. The RDV would provide for a stand-alone AR&D test platform or used with target vehicles such as the CEV. The RDV could be used with the CEV for emergency rescue providing de-orbit propulsion. The RDV could be used in ISS reboost support allowing a mated ICCS vehicle to reboost the ISS. Two RDV's, simultaneously docked to the ISS, could be used for ISS attitude control.

Figure 1:
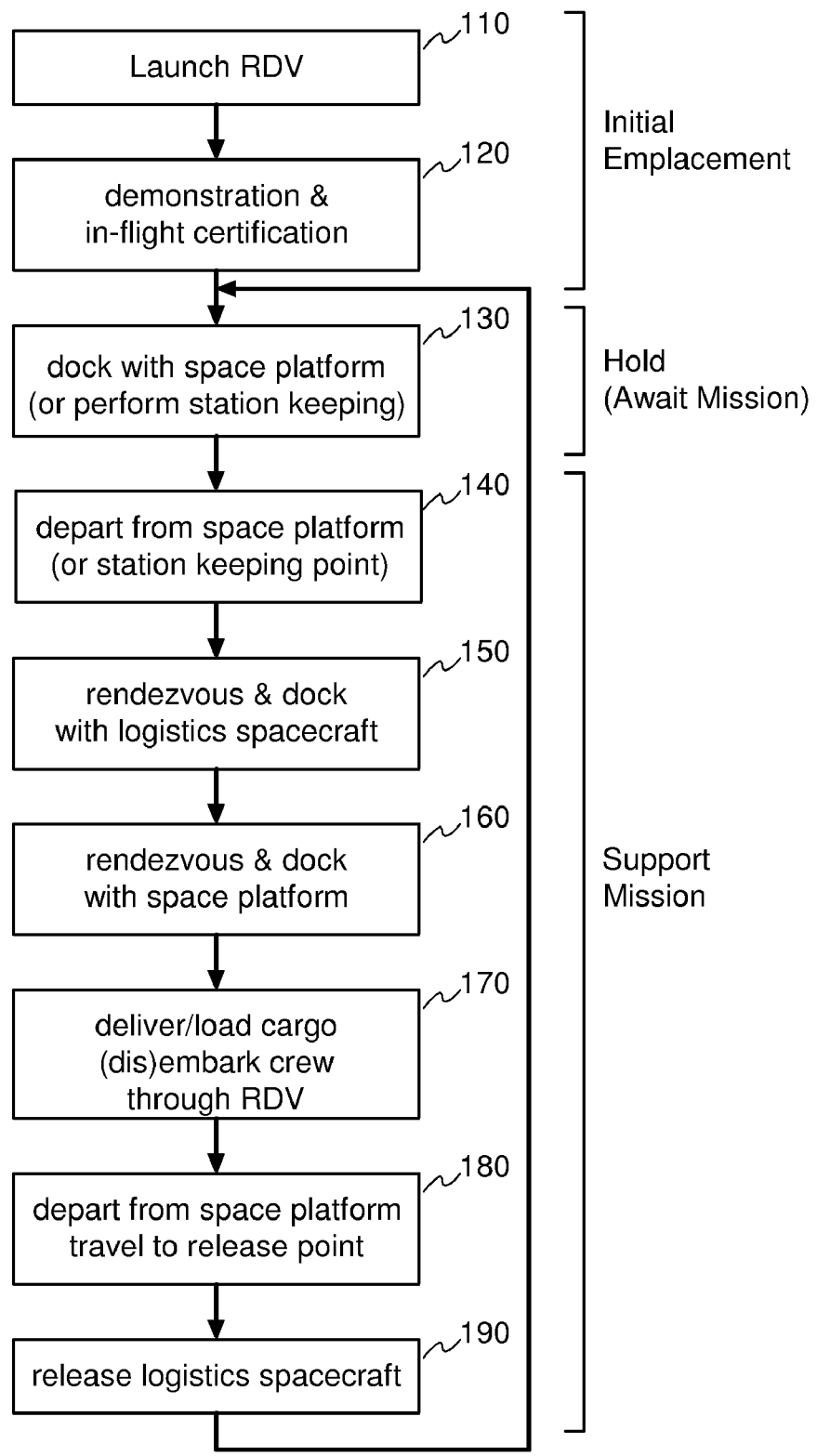

Illustrated in FIG. 1 is a flowchart following a basic operational scenario in accordance with one embodiment. The scenario involves the logistics support of a space platform. (That is, the RDV provides the AR&D functions for logistics spacecraft visiting the platform.) Generally, there is an initial emplacement phase, followed by continuing operations, concluding with an end-of-life disposal of the RDV. The continuing operations include holding, awaiting support missions, and the support missions themselves.

The RDV system is put in place by launching the RDV spacecraft (110). Spacecraft flight tests are then performed to verify that all systems are functioning properly (120). Other tests may also be performed to validate procedures or certify/qualify the spacecraft in accordance with flight rules. The RDV then rendezvous and docks with the platform and remains at that location (i.e., awaits a mission) (130). In some instances, the RDV may perform station keeping (i.e., loiter at a safe location in the vicinity of the platform) rather than being docked with the platform. When its services are required, the RDV departs from its holding point (140) to rendezvous and dock with the logistic spacecraft (150). While the RDV is docked with the logistics spacecraft, the RDV rendezvous and docks with the platform (160). (Some logistics spacecraft may not require the AR&D services of the RDV, only needing the RDV as a docking mechanism.) Then, with the RDV acting as a conduit/adapter, cargo is delivered (unloaded) and any crew disembarks (170). Cargo may be loaded and crew members may embark as well. With the delivery/loading complete, the RDV can depart, docked with the logistics spacecraft, to a release point (180). The logistics spacecraft is then released (190) and the RDV returns to the platform (or some other hold point) and waits another mission (130). When releasing the logistics spacecraft, the RDV may assist by providing some de-boost capability. In some instances, the logistics spacecraft may be released at the platform, with the RDV remaining attached to the platform. When the RDV is no longer serviceable in regards to its rendezvous functions, the RDV may be deorbited or may remain at the platform to serve as a docking mechanism/adapter.

One embodiment of an RDV comprises two modules that can be pressurized. The bodies of the modules are substantially the same. Together these house and control virtually all of the spacecraft equipment and functions. Coupled to the body of a module are two mating (i.e., docking) mechanisms. The two modules are connected to each other via the CBM. At the opposing end of each module is a docking mechanism. Also included is the supporting docking control system including sensors, communication, etc. The two modules are designed to be nearly identical to reduce design, development, test and production costs. The docking mechanisms for each module need not be the same and are the principal module-specific facets. Use of the Androgynous Peripheral Attachment System (APAS) as one of the docking mechanisms allows the RDV to dock with the ISS. Use of a "standard" NASA Exploration Initiative docking mechanism as the other docking mechanism allows the RDV to retrieve logistics spacecraft employing such a mechanism. For simplicity and stability reasons, the RDV "pulls" the logistics spacecraft to ISS on final approach.

Illustrated in FIG. 2 is a functional block diagram in accordance with one embodiment. An RDV is shown with an interface appropriate to mate a visiting vehicle to the ISS. The RDV comprises two modules: RDV/ISS Interface Element (RIIE) 280, and RDV/vehicle interface element (RVIE) 290. The RIIE is the RDV's principal functional element. The RIIE contains the majority of the spacecraft operational and functional systems (avionics, propulsions system, etc.), and a pressurizable passage. The passage allows for transfers as well as operation of the associated interface/docking mechanisms (e.g., hatches). The RDV uses an existing Androgynous Peripheral Attachment System (APAS) interface (210), which is the current, nominal Shuttle docking mechanism, to allow the vehicle to attach to one of the ISS Shuttle docking ports. APAS 210 is permanently affixed to RIIE logistics and operations unit 220. On the opposite side of RIIE unit 220 is the active part of a Common Berthing Mechanism (CBM) interface (230). The CBM is another existing hardware interface used by the ISS. The active CBM is mated to its passive CBM (240) counterpart. The passive CBM is permanently affixed to RVIE body 250. The RVIE provides additional propulsive capability and allows for sufficient clearance for interface mechanism operation. The RVIE also serves as a link to the external mating interface (260) which is expected to be the "standard" mechanism used for NASA's Exploration Initiative. (Examples include the Advanced Docking and Berthing System—ADBS, or the Low Impact Docking System—LIDS). This external interface will serve as the connection for objects developed for delivery to the ISS. Power and data can be compatibly transferred through each interface so that the ISS and the independently supplied elements can appropriately exchange required resources and information. Furthermore, volume and passageways commensurate with the needs of each mechanism and interface are implemented.

The APAS (210) interface allows for docking to the ISS Shuttle docking port(s) without any modification to the ISS. The AR&D function can be accomplished in a variety of ways, and may include modernized functions and equipment, and/or re-use of existing sensor equipment (centerline target, laser reflectors, etc.).

The RIIE (280) is the RDV's principal functional element. It includes the majority of the avionics equipment, communication system, thrusters (e.g., 281, 282) for orbital maneuvers and attitude control, propellant supply, main computer/data processing system, main power system, thermal control and other spacecraft functions. It also includes sufficient pressurized (or pressurizable) volume to allow operation of the hatches for the APAS and the CBM.

The mated CBMs (the combination of active CBM 230 and passive CBM 240) allows for the RDV's free-flight operation. The principal advantage of the CBM implementation is that the interface can be separated after docking. For example, the separation may be performed using the robotic arm of the Space Station Remote Manipulator System (SSRMS). The RVIE (290) and its passive CBM can then be repositioned and mated with an existing active CBM interface on the ISS, such as at nadir Node 2. With the logistics spacecraft attached to the repositioned RVIE module, delivery operations can then proceed through the ISS CBM interface. The CBM interface allows for the transfer of much larger cargo elements than the APAS, including key standard-sized items (such as racks), which is critical to ISS maintenance and operations. It also can be used to support existing capabilities for transferring oxygen, water, waste water, etc. If the RVIE is not mated to a logistics spacecraft, relocation of the RVIE module and the mating of its passive CBM to an active CBM of the ISS essentially creates a "new" (temporary or permanent) standard Exploration Initiative docking port. It should be noted that other manipulator mechanisms can be used, and references to a remote manipulator system such as a robotic arm should be construed to include other grappling and manipulation mechanisms.

Between the passive CBM (240) and the external mating interface (260) (e.g. ADBS) is the RDV's supplementary logistics and operations unit (250). The RVIE includes a number of ancillary and/or redundant spacecraft systems, such as propulsive capability (thrusters) for added control authority. The RVIE provides sufficient volume and clearance for the operation of the docking mechanisms coupled to the module body (e.g., opening the hatch).

External mating interface (260) is attached to an independently provided logistics spacecraft during retrieval and, in the attached, integrated configuration, can serve as a modernized docking interface for the ISS to allow vehicles such as the Crew Exploration Vehicle (CEV) to dock with the ISS (as represented in the current NASA plans). As shown, the RDV is equipped with grapple fixtures (271, 272). These fixtures facilitate the relocation of the RDV (or a module of the RDV) by the ISS robotic arm or other manipulator systems.

The RDV docks with the logistics spacecraft using a docking mechanism that can be different from the existing ISS docking mechanisms. This docking mechanism can, for example, be a "new", readily available docking mechanism, thereby reducing the costs associated with the mechanism. Because the reusable RDV docks with the ISS, it preserves the scarce, "old" docking mechanism.

The RDV provides a pressurized passageway so that crew and/or cargo can be transferred between the logistics spacecraft at one end of the RDV and the ISS at the other end of the RDV. In this embodiment, the passageway geometry is conservatively sized to accommodate the largest opening of any of the mechanisms. There are two principal options. The first is to transfer crew and/or cargo directly through the APAS after docking. However, the APAS geometry does not allow for the transfer of large cargo items such as an ISS standard rack, nor does it allow for the direct transfer of water to the ISS, nor waste water to the logistic element (for disposal). The two-module RDV employing the CBM (or other such mechanism) allows for a second option. The RDV module mated to the logistics spacecraft can be separated from the RDV module mated to the ISS and relocated to an ISS CBM using the ISS's robotic arm (the Space Station Remote Manipulator System—SSRMS).

Illustrated in FIG. 3 is the operation of an RDV as in one embodiment. The RDV is launched (310) and executes the equivalent of a visiting vehicle (VV) demonstration mission to the ISS in order to ensure all safety related functions perform as expected (311). The RDV then waits, attached to ISS (312), for the launch of a logistics spacecraft into a compatible target orbit (313). Once the target orbit state is established, the RDV departs from the ISS (314) to rendezvous (315) and dock with the logistics spacecraft (316). The combined RDV and logistics spacecraft, under control of the RDV, then rendezvous (317) and docks (318) with the ISS in accordance with VV requirements. When the logistics spacecraft delivery/mission is complete, the logistics spacecraft is either released (319) or towed away (321) for departure (320, 323) and returns to earth (recovery or disintegration as appropriate to the capabilities) while the RDV remains at ISS (319, 322) to be used in a subsequent operation.

Illustrated in FIG. 4 is the retrieval and docking of a logistics spacecraft in accordance with one embodiment. RDV 410 rendezvous and docks with logistics spacecraft 420. RDV 410 and logistics spacecraft 420 form a combined spacecraft 430. Combined spacecraft 430 then rendezvous and docks with ISS 440 at APAS 445. The docking could also have taken place at an alternative port such as APAS 446.

Also illustrated in FIG. 4 is the relocation and docking of a logistics spacecraft and RDV module in accordance with one embodiment. RDV 410 comprises RIIE 411 and RVIE 412. The RDV of combined spacecraft 430 docked at APAS 435 is split. SSRMS 441 grapples RVIE 412. RVIE 412 is then split from RIIE 411 and RVIE 412 is relocated and docked to CBM 450.

Figure 5A:
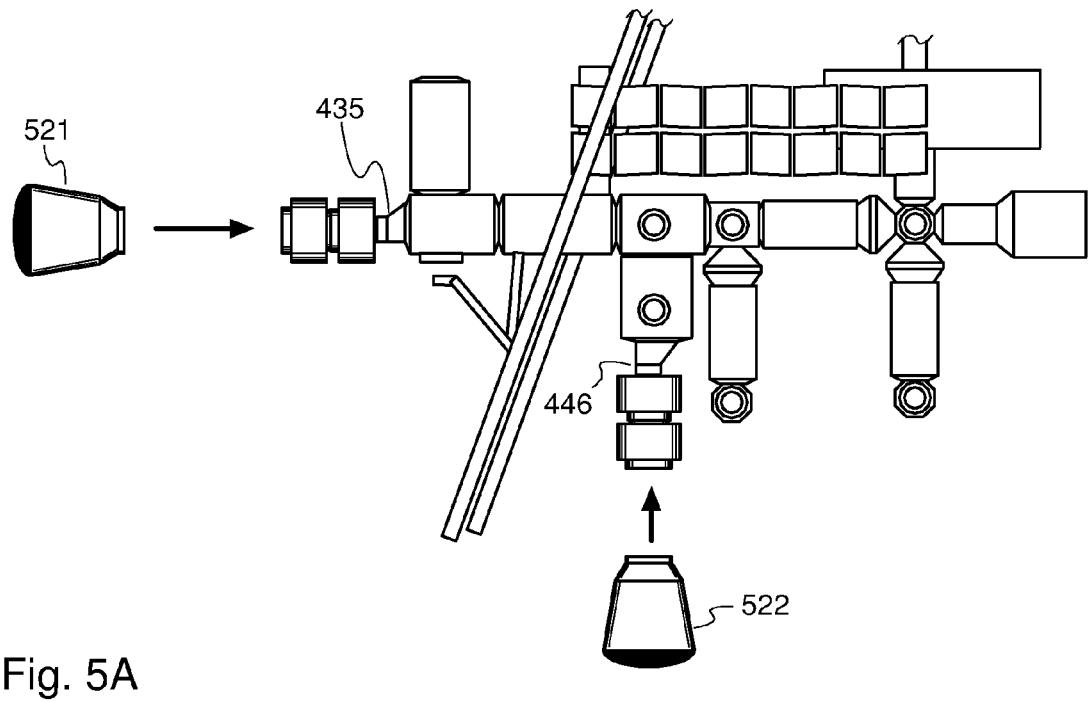
Figure 5B:
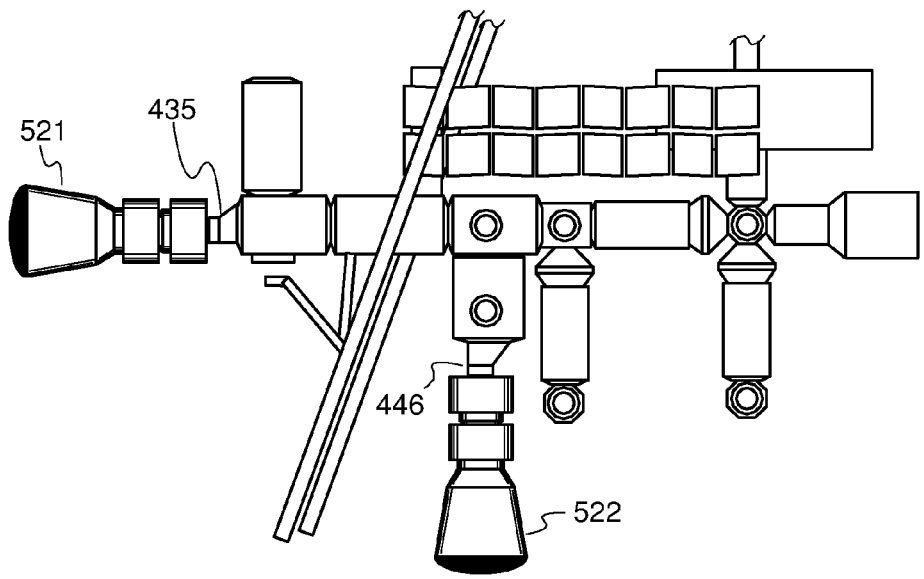

Illustrated in FIG. 5A and FIG. 5B is the rendezvous and direct docking of a logistics spacecraft in accordance with one embodiment. The logistics spacecraft shown are CEVs. CEV 521 rendezvous and docks with ISS 440 at the already docked RDV 560 located at APAS 435. CEV 522 rendezvous and docks with ISS 440 at the already docked RDV 570 located at APAS 436.

FIG. 6 and FIG. 7 illustrate the use of two RDV embodiments where the RDVs mate two target spacecraft and then extricate (remove) themselves as might be necessary in an assembly operation. One or more robotic arms are used to mate the target vehicles. One scenario illustrates docking and the other illustrates robotic free-flyer capture (variations on docking and robotic free-flyer capture are also possible).

FIG. 6 illustrates the mating of two target vehicles in accordance with one embodiment. RDV 610 includes a manipulator system including robotic arms 611 and 612. RDV 610 rendezvous and docks with target spacecraft 620 (601, 602). RDV 610 then rendezvous and docks with target spacecraft 630 (603). Arms 611 and 612 grapple target spacecraft 620 and 630, respectively (604). RDV 610 then extricates itself by undocking from the target spacecraft, moving from between the target spacecraft (605), and, using the robotic arms, mating target spacecraft 620 with target spacecraft 630 (606). RDV 610 then releases both of the mated/docked target spacecraft (607).

Alternatives to the procedure described for FIG. 6 include variations on docking. One alternative is to only dock with target spacecraft 620, not with target spacecraft 630. Another variation is to not dock with either target spacecraft.

FIG. 7 illustrates the mating of two target vehicles in accordance with one embodiment. RDV 710 includes robotic arm 711. RDV 710 rendezvous with and performs a free-flyer capture of target spacecraft 720, grappling it with arm 711 (702). RDV 710 then rendezvous with target spacecraft 730 (703). RDV 710 then releases target spacecraft 720 and performs a free-flyer capture of target spacecraft 730 grappling it with arm 711 (704). RDV 710 then mates/berths target spacecraft 730 with target spacecraft 720 (705). RDV 710 then releases the mated/docked target spacecraft (706).

There are many other missions in which the RDV can play a role. For example, in support of ISS traffic, the RDV can "free-up" attachment ports (i.e., docking mechanisms) by undocking and moving logistics spacecraft away from the ISS, loitering while other vehicles use the port, and then returning to the ISS. The RDV can also be used as a test article for other spacecraft needing to perform rendezvous, proximity operations, and docking tests. The RDV can perform in either the active or passive role during a rendezvous and proximity operations pass. In the case of the two-module RDV, to accommodate additional spacecraft/missions, it may be sufficient to produce a second module rather an entire spacecraft. Also, a single module may be replaced if needed.

Those of skill in the art will understand that the RDV may be implemented using any of a variety of different technologies and techniques, mechanisms, interfaces, etc. For example, the RDV may use any of a wide variety of docking mechanisms on each of the modules (including identical or complementary/compatible mechanisms). Further, the RDV may be capable of docking or otherwise coupling a wide variety of logistics spacecraft, space platforms, or other spacecraft.

Those of skill will further appreciate that the various components of the embodiments described above are intended to be illustrative of the structures that are possible, rather than limiting. Alternative embodiments may use different components, combine functions into fewer components, distribute functions among additional components, and so on. Similarly, the methods described above are illustrative, and alternative embodiments may perform the steps of the described methods in other orders, add steps, omit some steps, combine or divide steps, and so on. The various illustrative components, modules, and steps have been described above generally in terms of their functionality, and the choice of particular components, modules or steps depends upon the particular application and design constraints imposed on the overall system. Those of skill in the art may implement the described functionality in varying ways for each particular application, but such implementation decisions should not be interpreted as causing a departure from the scope of the present invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A reusable rendezvous and docking vehicle (RDV) comprising:
   a first docking mechanism configured to mate with a first target spacecraft;
   a second docking mechanism configured to mate with a second target spacecraft;
   an RDV body coupling the first docking mechanism to the second docking mechanism, wherein the RDV body has a passageway from the first docking mechanism to the second docking mechanism, wherein the RDV body comprises a first module and a second module, wherein the first module is configured to separably mate with the second module, and wherein the first docking mechanism is coupled to the first module and the second docking mechanism is coupled to the second module; and
   a flight control system mounted in the RDV and configured to maneuver the RDV.

2. The RDV of claim 1, wherein the passageway is configured to be pressurized.

3. The RDV of claim 1, further comprising a propulsion system mounted on the RDV body and configured to be controlled by the flight control system.

4. The RDV of claim 1, further comprising a docking control system residing in the RDV.

5. The RDV of claim 1, wherein the flight control system is an automated flight control system.

6. The RDV of claim 1, wherein the flight control system is an autonomous flight control system.

7. The RDV of claim 1, wherein the flight control system is configured to enable remote piloting of the RDV.

8. The RDV of claim 1, wherein the first and second modules each comprise a module body, and the module body of the first module and the module body of the second module have substantially the same configuration.

9. The RDV of claim 1, wherein the first docking mechanism is a first type of docking mechanism, and the second docking mechanism is a second type of docking mechanism, wherein the first type is different from the second type.

10. The RDV of claim 1, further comprising a thruster control system residing in the RDV configured to control one or more thrusters which are coupled to the first or second spacecraft.

11. The RDV of claim 1, further comprising a grapple fixture coupled to the RDV body.

12. The RDV of claim 1, further comprising a manipulator coupled to the module body and configured to manipulate one of the first spacecraft and the second spacecraft.

13. The RDV of claim 12, wherein the manipulator comprises two robotic arms.

14. The RDV of claim 1, wherein the RDV is configured to undock itself from the first target spacecraft and the second target spacecraft, and to dock the first target spacecraft directly with the second target spacecraft.

* * * * *